Jan. 9, 1951     T. RAPP     2,537,421
APPARATUS FOR FILLING CONTAINERS WITH LIQUID

Filed July 24, 1948     6 Sheets-Sheet 1

INVENTOR:
THEODORE RAPP
By Alan Franklin,
ATTORNEY.

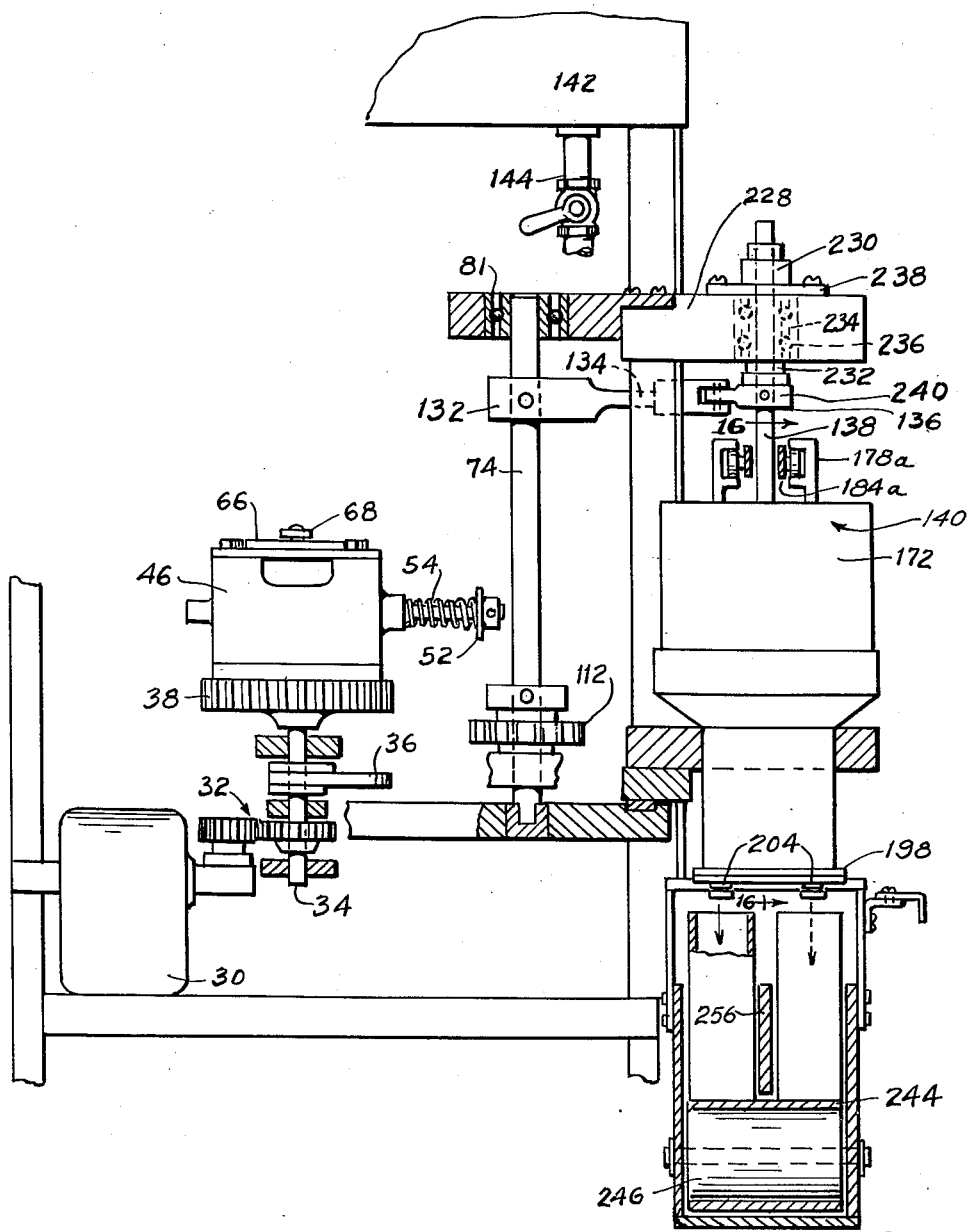

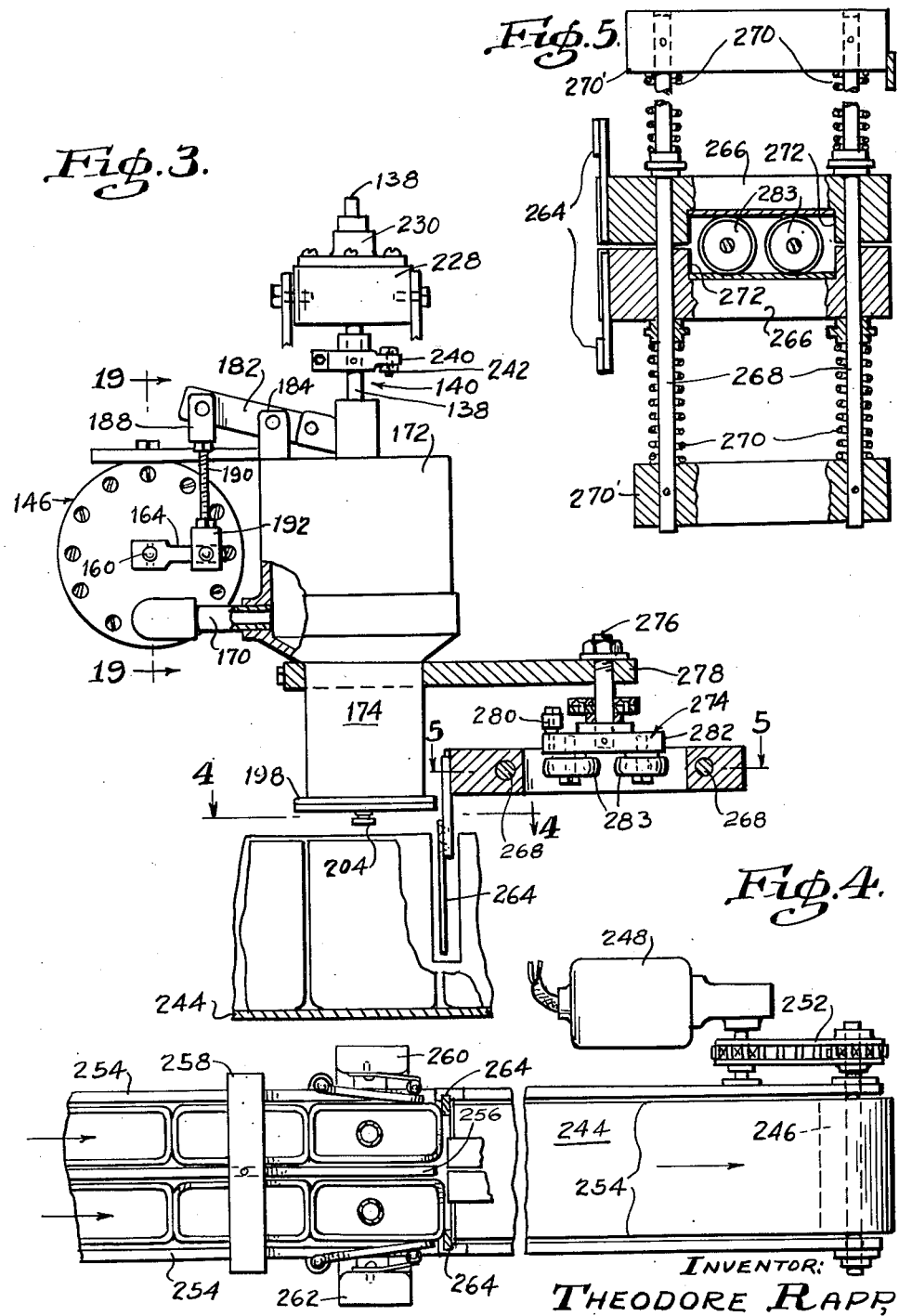

Jan. 9, 1951            T. RAPP            2,537,421
APPARATUS FOR FILLING CONTAINERS WITH LIQUID
Filed July 24, 1948            6 Sheets-Sheet 4
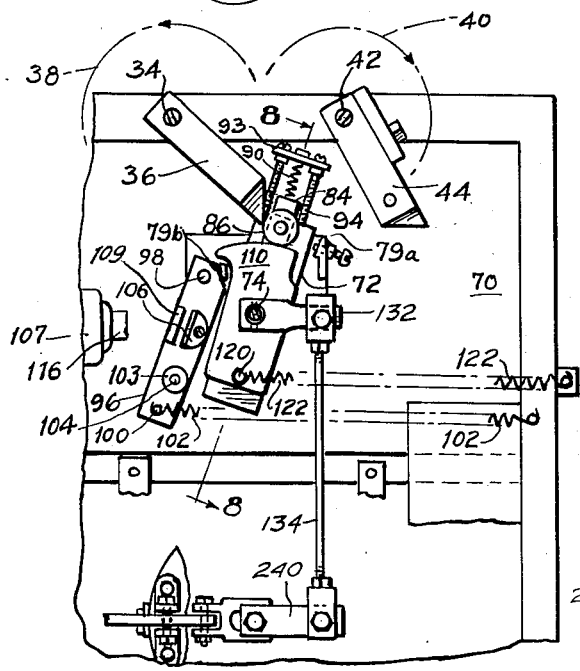
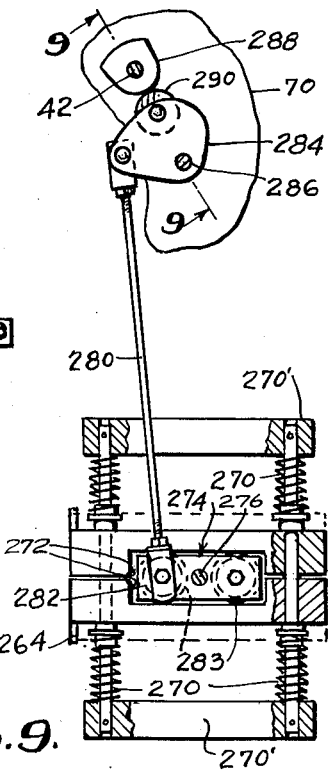
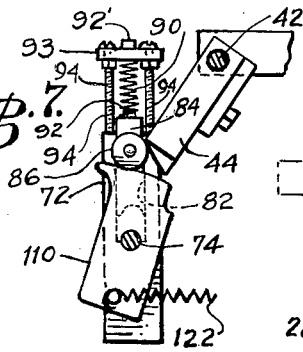
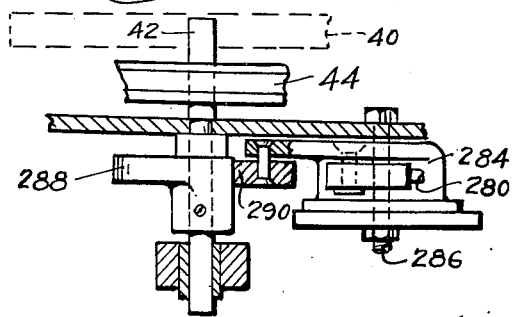
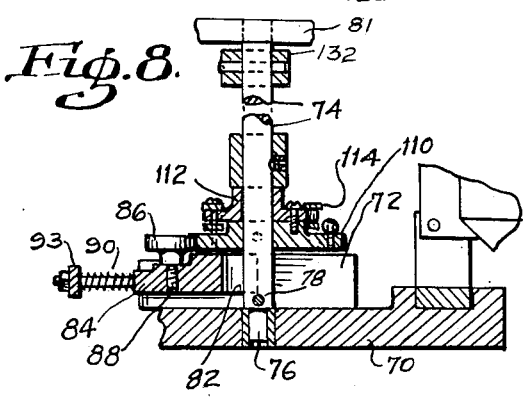
INVENTOR:
THEODORE RAPP
By Alan Franklin
ATTORNEY Jan. 9, 1951 T. RAPP 2,537,421
APPARATUS FOR FILLING CONTAINERS WITH LIQUID
Filed July 24, 1948 6 Sheets-Sheet 5
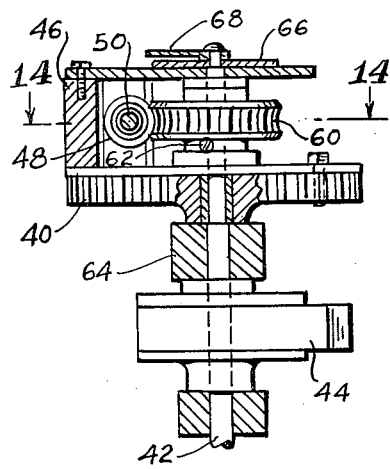
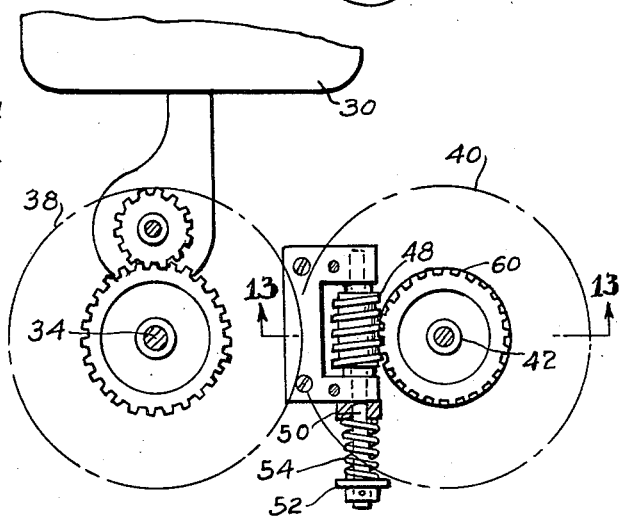
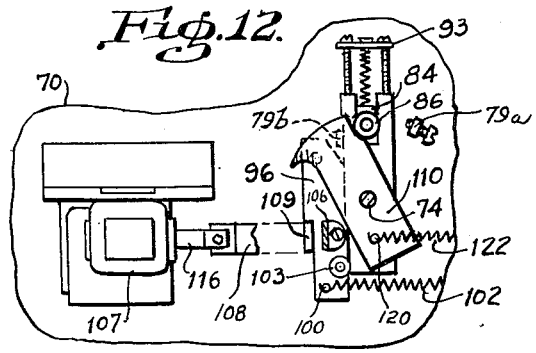
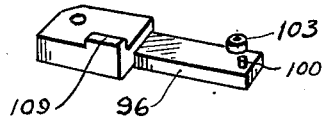
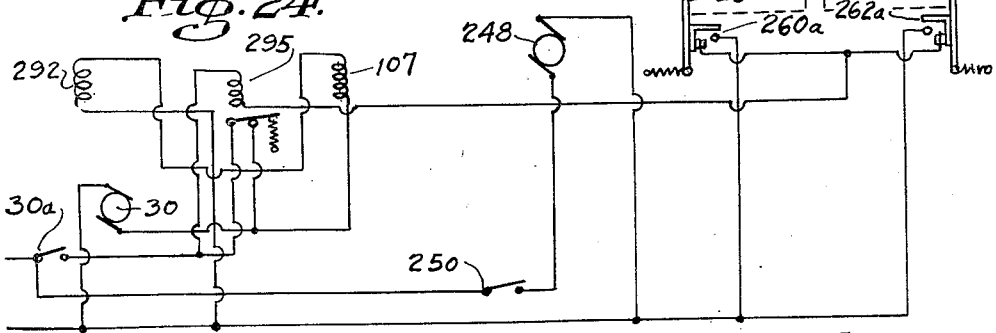
INVENTOR:
THEODORE RAPP,
BY Alan Franklin,
ATTORNEY.

Jan. 9, 1951 T. RAPP 2,537,421
APPARATUS FOR FILLING CONTAINERS WITH LIQUID
Filed July 24, 1948 6 Sheets-Sheet 6
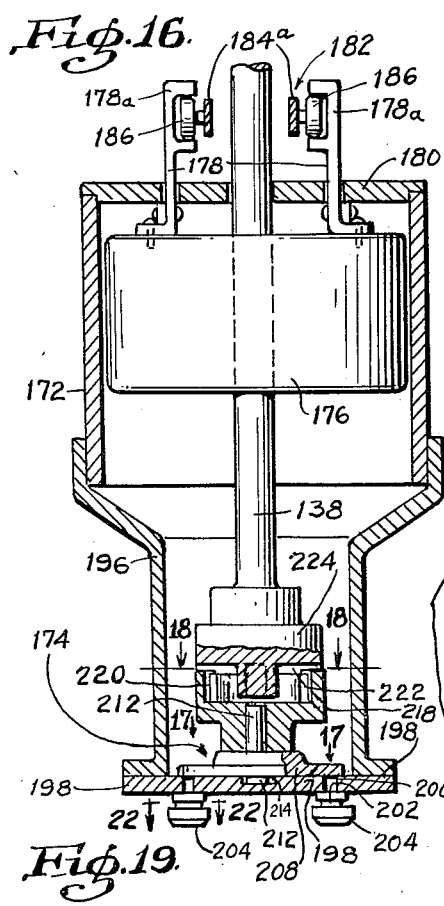
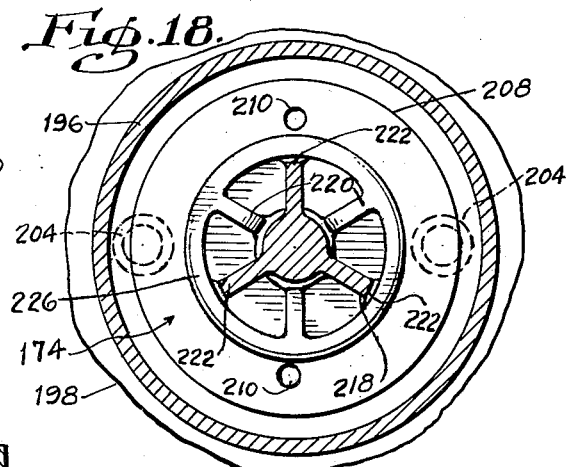
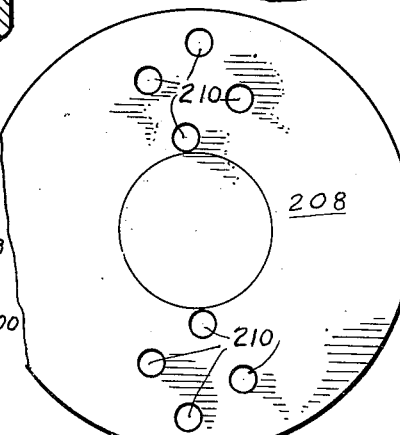
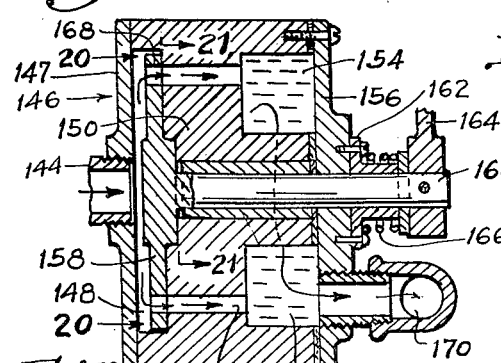
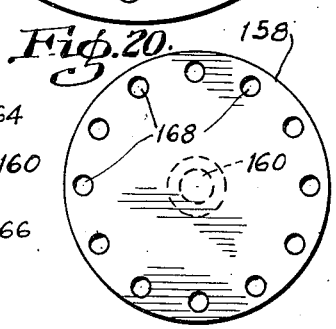
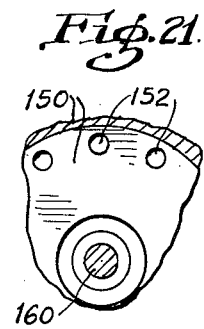
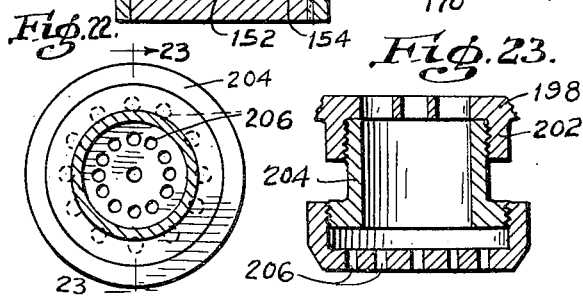
INVENTOR:
THEODORE RAPP
BY Alan Franklin,
ATTORNEY.

Patented Jan. 9, 1951

2,537,421

UNITED STATES PATENT OFFICE 2,537,421

APPARATUS FOR FILLING CONTAINERS WITH LIQUID

Theodore Rapp, Los Angeles, Calif.

Application July 24, 1948, Serial No. 40,581

14 Claims. (Cl. 226—125)

My invention relates to apparatus for dispensing measured quantities of liquid by controlling the timing of the flow of the liquid through metering valves and nozzles of predetermined openings into containers which may be of any kind provided that the containers are of uniform dimensions, it will be understood therefore that the apparatus has a wide field of application.

The apparatus is designed to be operated by electric motors as is universal practice in equipment of the type to which the invention relates and one of the objects of my invention is to provide means whereby the dispensing elements of the invention are immediately shut off should there be any failure in the supply of electric power.

Another object of my invention is to provide means to arrest the means operating the dispensing mechanism, should the working of the apparatus be interrupted for any reason by automatically operated circuit controlling means so that a full cycle is commenced on the resumption of operation. This feature is particularly important in view of the possibility of interruption of electrical power current or supply.

Yet another object of my invention is to provide means effective to cut off the electric current should no receptacle be correctly positioned in filling position, the dispensing valve being thereupon immediately set to cut off position until the receptacles are properly positioned.

A still further object of my invention is to provide means for adjusting the dispensing valve mechanism to different capacities of container, so that the correct amount of liquid is dispensed into each receptacle of a batch of identical receptacles.

A further object of my invention is to provide liquid flow control means in which friction is reduced to a minimum thereby reducing the power required to operate said means.

Still further objects and features of my invention will hereinafter appear from the following specification taken in conjunction with the accompanying drawings which illustrate an embodiment of the invention at present deemed preferable by me.

In the drawings:

Fig. 2 is a side elevation with certain parts in section, looking in the direction of the arrow 2 in Fig. 1.

Fig. 3 is an end view of the assembled machine looking in the direction of the arrow 3 shown in Fig. 1, certain parts being shown in section.

Fig. 4 is a fragmentary plan view looking in the direction of the arrows 4—4 of Fig. 3, certain parts being broken away to show underlying parts.

Fig. 5 is a cross section on the line 5—5 of Fig. 3 drawn to a larger scale.

Fig. 6 is a fragmentary plan view of valve operating means in filling position during normal operating of the machine and almost at completion of movement.

Fig. 7 is a fragmentary plan view of the parts shown in Fig. 6 but in closed position.

Fig. 8 is a cross section on the line 8—8 of Fig. 6.

Fig. 9 is a fragmentary detail drawn to a larger scale of the gear shaft and cam arrangement indicated in Fig. 6, within circle A, drawn in side elevation and to a larger scale.

Fig. 10 is a plan view of cam-operated means controlling the can stop-and-release mechanism.

Fig. 11 is a perspective view of a part shown in Fig. 8.

Fig. 12 is a fragmentary view showing the position of the parts if the machine is suddenly rendered inoperative when operating cams are in position shown in Fig. 6.

Fig. 13 is a cross section on the line 13—13 Fig. 1 drawn to a larger scale.

Fig. 14 is a fragmentary plan view of the gears operating the valve opening and closing cams and of means for relatively adjusting the valve closing cam drawn to a larger scale.

Fig. 15 is a perspective view to an enlarged scale showing a member brought automatically into operation, when the machine is stopped, to hold the fluid dispensing valve in closed position.

Fig. 16 is a cross section on the line 16—16 of Fig. 2 drawn to a larger scale.

Fig. 17 is a detail plan view drawn to an enlarged scale looking in the direction of arrows 17 in Fig. 16 showing an alternative arrangement of orifices in a part appearing in Fig. 16.

Fig. 18 is a cross section drawn to an enlarged scale on the line 18—18 of Fig. 16.

Fig. 19 is a cross section on the line 19—19 of Fig. 3 drawn to an enlarged scale.

Fig. 20 is a cross section on the line 20—20 of Fig. 19.

Fig. 21 is a fragmentary cross section on the line 21—21 of Fig. 19.

Fig. 22 is a cross section on the line 22—22 of Fig. 16 drawn to a larger scale.

Fig. 23 is a cross section on the line 23—23 of Fig. 22.

Fig. 24 is an electrical wiring diagram showing the electrical wiring of the machine.

Figure 1:
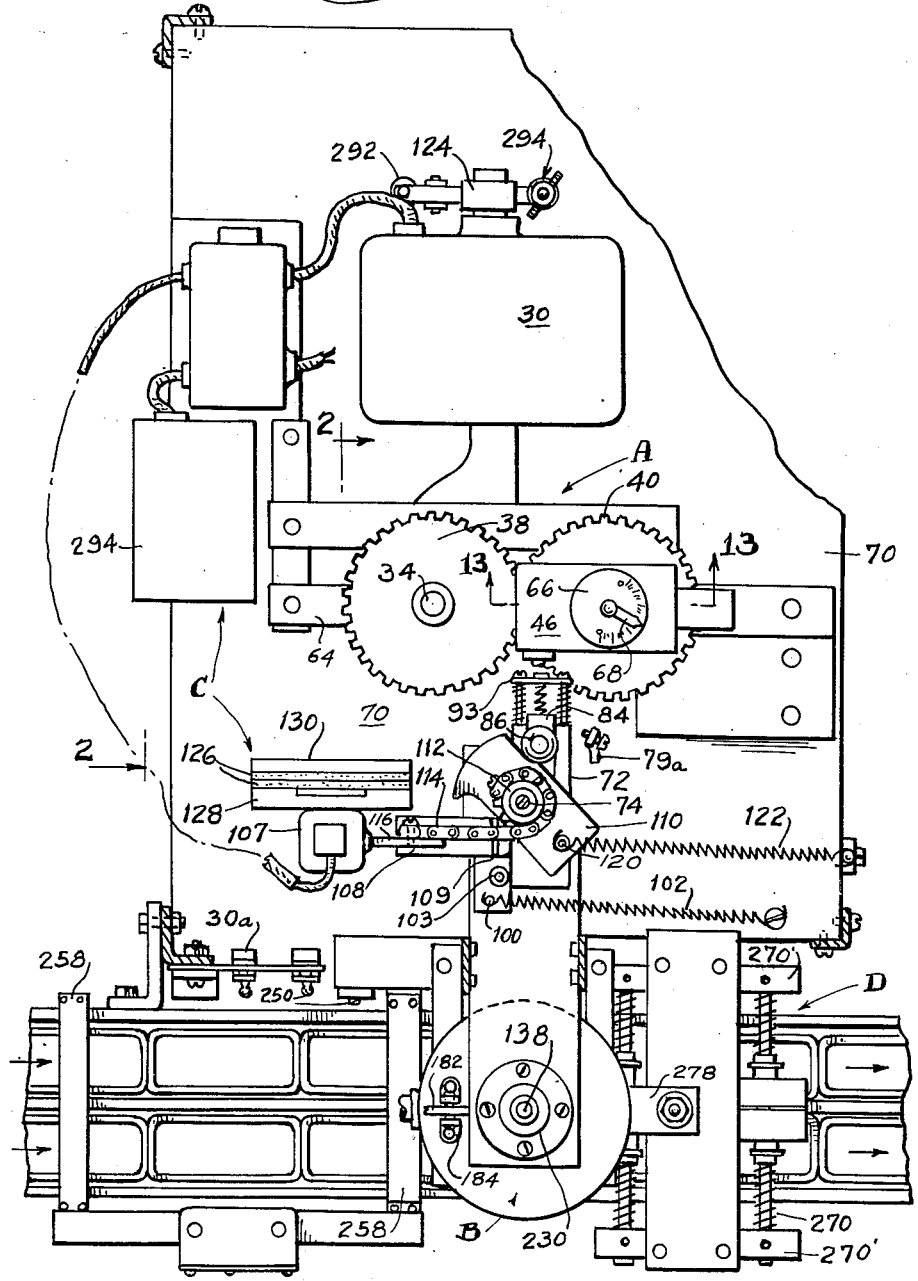
Fig. 1 is a plan view of the machine in assembled condition, certain parts shown in detail in other figures, being omitted for clarity and the parts being shown in operative position.

Referring now to Fig. 1 of the drawings, the letter A indicates generally motor-driven cam-operated actuating means, B indicates liquid dispensing means, C indicates automatically operating electrical control means and D indicates a container conveyor belt arrangement.

The numeral 30 in Fig. 1 indicates the main drive electric motor the circuit of which is manually controlled by switch 30a, and which through appropriate gearing 32 (Fig. 2) rotates a vertical shaft 34 on which a cam-ended arm 36 is secured, and to the upper end of which shaft a gear 38 is secured.

A second gear 40 meshing with gear 38 drives a second vertical shaft 42 (Fig. 13) through an adjustable connection to said shaft. On shaft 42 is secured a second cam-ended arm 44, in the same horizontal plane as cam arm 36 (see Fig. 6) the cam arms rotating in opposite directions as will be evident. Cam arm 36 is effective to open the liquid outlet valve, later described, while cam arm 44 acts to close the liquid outlet valve, the length of time during which the valve remains open being determined by the adjustment of shaft 42 with respect to gear 40 by the following arrangement (see Fig. 13). A yoke 46 is secured to the upper surface of gear 40 and therefore rotates with it. A worm gear 48 is secured on a shaft 50 carried in bearings in opposite sides of the yoke and is extended to one side and fitted with a thumb-wheel 52 by which the worm may be rotated. A spring 54 is placed under compression between thumb-wheel 52 and the adjacent side of the yoke to prevent jarring of the mechanism from slacking back the worm.

The worm 48 meshes with a worm gear 60 rotatable with respect to gear 40 but held against axial movement relatively to the gear, and shaft 42 is pinned by a threaded stud 62 to the worm wheel. The gears 38 and 40 are supported on a frame member 64. It will be evident that by rotation of thumb-wheel the setting of cam arm 44 can be adjusted relative to that of cam arm 36 and thus the time the liquid outlet valve is left in open position can be adjusted.

In order to indicate to the operator the exact setting of the fluid closing valve a graduated dial 66 is mounted on the upper surface of yoke 46. A pointer 68 (Figs. 13 and 14) moving over the dial 66 is secured to the upper end of shaft 42 and as shaft 42 is rotated by the thumb-wheel 52 the pointer will indicate the setting on the dial which may be graduated to show the flow, in fluid ounces or cubic inches, permitted by the setting.

Turning now to the valve control means operated by the cam-ended arms 36 and 44, and referring particularly to Figs. 6 through 8 and 15 through 17. A base plate 70 is mounted on frame members (not shown) and on this plate a valve operating arm 72 is mounted for oscillatory movement by a vertical shaft 74 supported at its foot in a bearing 76 in base plate 70 and passing through a bore in arm 72, forming a pivot for the arm to which it is secured to by set screw 78. The oscillation of arm 72 about the axis of shaft 74 is limited by stops 79a and 79b projecting upwardly from base 70 at opposite sides of the arm. Towards the upper end of shaft 74 a short arm is clamped and operates valve actuating means later described. The upper end of the shaft 74 is supported in a bearing 81 carried by a frame member.

The arm 72 is machined out at one end to provide a slide way 82 mounting a block 84 (see Fig. 7) carrying a roller 86 journalled on a vertical pin 88 screwed into the block, the rear end of which is cut out to abut shaft 74 in the inward position of the block. Block 84 is resiliently urged inward by a helical spring 90 secured at one end by stud 92 screwed into the outer end of the block 84 and under compression between the block and a cross head 93 mounted on spaced rods 94 screwed into the end of the arm 72. An arm operating member 96 is pivoted on the plate 70 at one side of the arm on a pin 98 and at its opposite end is provided a pin 100 to which is secured one end of a helical tension spring 102 the other end of which is secured to a frame member. Adjacent the pin 100 the member 96 carries horizontal roller 103 mounted on a pin 104. The roller 103 is positioned to engage against the side of the end of arm 72. The roller 103 is held away from arm 72 during operation of the machine by an engaging block 106 which may be of fibre, mounted on a member 108 connected to the core of a normally energised solenoid 107 later more specifically described, the block 106 being engageable with an upstanding lug 109 on member 96. Roller 86 is normally held in outward or arm-operating position by a cam 110 secured to a chain sprocket 112 mounted to turn freely on shaft 74 and normally held in position to keep the cam in outward position by a length of chain 114 trained round the sprocket with one end secured thereto and the other end secured to the stem 108 connected to the core 116 of the solenoid 107 which in normal operation of the machine is in energised condition.

The tail of the cam 110 is provided with an upstanding pin 120 to which is secured one end of a tension spring 122 the other end of which is secured to a frame member. In the de-energised condition of the solenoid the spring 122 is effective to swing the cam to the inoperative position shown in Fig. 12 in which it will be noted that the cam has been moved to such a position by the spring tensioned arm operating member 96 that the roller 86 drops off the face of the cam 110.

When the solenoid is again energised, pulling the chain 114 in a direction to swing the cam clockwise, the forward edge of the cam forces block 84 outwardly in its slideway until the roller is positioned on the arcuate face of the cam, whereupon the solenoid core brings block 106 into engagement with lug 109 on the arm operating member and pulls it out of engagement with the arm. When the circuit is interrupted either by manually switching off the motor 30 or by means of safety switches or by failure of the electric current as later described, the spring 102 acts to swing the operating member roller 103 against the tail of the arm 72 to move the arm to the valve shut off position while spring 122 instantaneously swings the cam to the position shown in Fig. 12 so that the block 84 is freed to be moved with operating roller 86 out of the path of arms 36, 44 and rotating shaft 74 to shut off position because sprocket 112 is rotated anticlockwise by the spring.

It will be understood that in the operating position arm 72 is free from any constraint other than the position movement imparted to it in one direction by cam arm 36 and in the opposite direction by cam arm 44.

The motor 30 is provided with an electromagnetic brake 124 which is adjustable so that the arm 36 may be brought to rest just before engaging the roller 86 to move the shaft to opening position to ensure that the proper cycle of the machine is gone through and no cans are passed through the filling station without being properly filled with liquid.

In order to prevent jar due to the sudden movement of the solenoid core member 116 from being transmitted to the frame of the machine and thence to other of the mechanisms, I prefer to insert layers of shock absorbent material 126 between the solenoid base 128 and mounting bracket 130 which secures it to the frame of the machine.

The short arm 132 (Fig. 2) clamped to the upper end of the shaft 74 is shown at 132 and a push pull rod 134 is connected at one end to this arm and at its other end to an arm 136 clamped to the vertical operating shaft 138 of a liquid dispensing structure generally indicated by the numeral 140 the specific arrangement of which will be later described.

A main fluid tank 142 is arranged above the fluid dispensing means on frame members of the machine and fluid is delivered by pipe 144 to a flow control valve 146, shown in section in Fig. 19. The pipe 144 from the main tank leads through the front plate 147 of the valve into a chamber 148 between this front plate and the front face of the main body 150 of the valve. The main body is drilled with a circumferential series of small holes 152 passing through the body into the outlet chamber 154 machined in the opposite or back face of the body 150 and closed by back plate 156. A flow control disc 158 (see Fig. 22) is fitted against the front face of the body and is rotatable by shaft 160 which is fitted in an axial bore in the body and is centrally secured to said disc. The central portion of the body around the shaft is extended to be in the same plane as the outer peripheral face of the body 150 and back plate 156 is secured in liquid tight relation to this central portion and the peripheral face. The shaft 160 is extended through a boss 162 on the outer side of the back plate 156 and a short arm 164 is pinned to the shaft. A helical compression spring 166 is arranged between the head of arm 164 and the outer face of back plate 156 and serves to hold disc 158 closely against the body of the valve.

Disc 158 is drilled with holes 168 spaced to align exactly with the holes 152 in the body or to be moved entirely out of registration therewith in the closed position of the valve.

An outlet pipe 170 is connected to the outlet chamber 154 and leads fluid to the liquid dispensing means now to be described.

Referring now to Figs. 3 and 16 pipe 170 is connected to the tank 172 of a dispensing valve structure 174 below float 176 fitted for free vertical movement in tank 172. A pair of upstanding arms 178 are secured to the top of the float and pass through openings in the cover 180 of the tank. Arms 178 are provided with horizontal channel sections 178a. A lever 182 is pivoted on a bracket 184 secured on the tank cover, this lever being provided with a forked end 184a. Each arm of the fork is provided with rollers 186 carried on pivot pins projecting from the arms of the fork, the rollers working in the channel sections of the arms. The opposite end of lever 182 is pivoted to a stirrup 188 to which one end of a connecting rod 190 is adjustably secured. The opposite end of the rod 190 is adjustably secured to a second stirrup 192 to which the end of short arm 164 clamped on shaft 160, is pivoted.

Float 176 is provided with a central passage and the vertical operating shaft 138 is arranged to extend axially through the top wall of the float chamber and float into a cylindrical valve chamber 196 extending vertically below the float chamber. The bottom wall of the valve chamber is formed by a plate 198 (see Fig. 17) and this plate is pierced at diametrically opposite areas with a group 200 of small holes spaced regularly or if preferred with a pair of holes. The lower face of plate 198 is provided with tubular stubs 202 (Fig. 23), surrounding the openings. Nozzles 204 preferably provided with a larger number of finer openings 206 and of larger area than the cross section of the tubular stubs are threaded or pushed on the lower end of the latter or of tubes inserted in the stubs, and ensure a low pressure discharge of fluid, thus avoiding splashing.

The discharge of fluid through the openings in the bottom plate 198 is controlled by a plate valve 208 pressed against the upper surface of plate 198 and provided with a group of holes 210 registering with the holes in plate 198. I prefer to drill the holes 210 slightly off center with respect to the holes in plate 198 (Fig. 17). The plate valve is provided with a locating stub 212 fitting in a center recess 214 in bottom plate 198 and with a stem 216 secured in a cup-like driven member 218 shown in detail in Fig. 18, formed with radial inwardly projecting flanges 220 between which extend the splines 222 of a drive member 224 secured to the lower end of valve operating shaft 138, obviously any other suitable flexible coupling may be used. Between the flanges 220 and splines 222 accurately molded blocks 226 of resilient material are fitted, thus slight cocking of the operating shaft cannot cause binding of the valve. The upper end of the operating shaft 138 passes through a bore in a spring housing and upper bearing bracket 228 (Fig. 2) secured to the frame. A bearing cap 230 secured to the bracket 228 over the bore receives and steadies the end of the shaft. A bearing washer 232 is pinned to the operating shaft to fit in the bottom of the bore 234 in the bracket member 228 and a helical compression spring 236 is arranged under tension between the bearing washer 232 and bearing cap plate 238 mounted on bracket 228 thus holding the plate valve 208 under pressure against plate 198.

A short arm 240 is pinned to the valve operating shaft 138 below the bracket member 228 and one end of connecting rod 242 is pivotally secured to the short arm 240 while the other end of the connecting rod is pivotally secured to the short arm 80 (Fig. 6) secured on the upper end of valve operating vertical shaft 74 rocked by the cam-ended arms 36, 44.

The can conveyor belt assembly, as shown in Fig. 4, comprises a smooth surfaced continuously driven endless belt 244 carried on rollers 246 and designed to carry the cans two abreast under the filling nozzles 204 (Fig. 4).

A motor 248 controlled by a switch 250 (Fig. 1) is provided to drive the conveyor belt through a chain drive 252 to the leading rollers.

In order to properly align the containers with the filling nozzles the conveyor band is provided with side walls 254 and with a longitudinally extending center partition 256 the sidewalls and partition being held in position by bridge members 258 and brackets connected to the machine frame in any suitable manner.

At the filling station switches 260, 262 are mounted one on each sidewall 254 and is effective to stop the operation of the machine, but not the running of the belt, should a container not be properly positioned, the arrangement of these switches and other co-ordinated electrically controlled components is later described.

The containers are held at the filling station for a predetermined period by stop plates 264 projecting in to the path of the containers, as shown in Fig. 5, and mounted on carrier members 266 mounted for movement toward and away from one another on slide rods 268 carried transversely of the belt in a frame 270' secured to the frame of the machine and extending over the belt. The carriers 266 are urged toward one another by helical compression springs 270 arranged around the slide rods between the sides of the carrier members and the frame members 270'.

Aligning recesses 272 are milled from the meeting surfaces of the carrier and a cam generally indicated at 274, is arranged to work in the recess 272 between the carriers members.

The cam is mounted on a vertical shaft 276 carried for oscillation on an outrigger frame member 278 (Fig. 3) and serving as a pivot for the cam.

The cam shaft 276 is oscillated by a connecting rod 280 (Fig. 10) pivoted at one end to a plate 282 carrying a pair of horizontal rollers 283 on pins mounted in the plate the whole functioning as a cam. At the other end rod 280 is connected to a rocking piece 284 pivoted on a pin 286 projecting from a frame member and holding the rocking piece in position to be engaged by a cam 288 mounted on vertical shaft 42 which is the shaft on which dispensing valve operating cam 44 is also mounted. Preferably a roller 290 is mounted on piece 284 to be engaged by cam 288.

The operating circuit of the machine is shown in Fig. 24. The solenoid 292 of the brake for motor 30 acts while energised to hold the brake off against the effort of a spring 294 which is effective immediately the solenoid is de-energised to apply the brake and stop the motor, and is adjusted so that the cam arm 36, which opens the dispensing valve, is stopped against arm 72 so that the valve is opened immediately the motor 30 is restarted. The brake solenoid and main solenoid 107 are wired in series. A control circuit, normally broken when safety switches 260, 262 are kept open by the steady passage of cans past the filling position, is completed by swinging of either or both safety switches in inward direction, which energises switch relay 295 which breaks the operating circuit, but the operating circuit remains in condition to be again energized when contacts 260a, 262a are again opened, de-energizing switch relay 295 and completing the motor circuit, at the same time energizing relay 292 which takes off the motor brake, and relay 107, which act to place arm 72 in condition to operate as previously described.

In setting the machine into operation the first step is to see that the main tank contains a sufficient supply of the liquid to be filled into the cans, when this has been attended to the stopcock in the pipe leading from the tank to the valve controlling the flow of fluid is opened. Fluid will flow through this valve into the tank of the dispensing valve until the float in the dispensing valve tank closes the control valve.

The belt conveyor motor is then switched on and cans to be filled with fluid will be carried to the filling station, pressing back the safety switches and being held in the filling station by the stop fingers, the smooth belt surface sliding under the bottoms of the cans. The main switch is then thrown to "on" position and since, as has been previously described, the brake on the motor is adjusted by suitably adjusting the tension of the brake spring to bring the arm into proximity to the arm actuating the fluid dispensing valve whenever the brake is applied, the latter immediately opens and fluid will at once commence to flow into the cans under the dispensing nozzles for the period determined by the setting of the valve closing cam arm relative to the valve opening cam arm. When the valve closing cam arm closes the dispensing valve the can stops are snapped out of engagement with the filled cans which then are carried away by the conveyor belt and the can stops snap into position to stop the next pair of cans to be filled under the filling spouts. The float control of the liquid in the tank above the dispensing valve ensures a steady and uniform head so that the amount of liquid delivered into each can is uniform, the steadiness of control being aided by the fine control of the flow of fluid into the dispensing valve float chamber afforded by the flow control valve.

When a batch of cans has been filled, the machine will be automatically stopped by the operation of the safety switches but will immediately start again when the first cans of a new batch are properly positioned under the filling nozzles.

The machine will operate, once the conveyor belt motor and main motor switches are placed in the "on" position as long as cans reach the filling station in steady succession but if there is a gap in either line of cans reaching the filling position the operation of one or both of the safety switches will immediately stop the machine until the continuously moving conveyor belt has caused the cans to become properly positioned when the machine will immediately begin again to operate.

Failure of electric power will also cause the control solenoid 107 to immediately release the dispensing valve mechanism to inoperative position in which the dispensing valve will of course be closed, but the machine will immediately restart when power is again supplied.

If a difference in the amount of liquid dispensed is required the necessary adjustment is quickly and accurately made, after stopping the machine, by the adjustment of the cam shaft carrying the valve closing cam.

I claim:

1. In a machine for measuring and dispensing amounts of liquid into a succession of containers and having means for moving a succession of empty containers to, and removing filled containers from, the machine; a source of liquid to be fed into containers; a prime mover; a liquid dispensing valve structure; a tank incorporated in said dispensing valve structure, mechanism operated by said prime mover to actuate said valve at timed intervals to dispense liquid during a predetermined interval of time; a liquid control valve; conduits leading liquid from said source of supply through said control valve to said dispensing valve tank; means actuated by the level of liquid in said disepnsing valve tank to adjust said control valve to maintain constant a predetermined level of liquid in said tank, whereby the amount of liquid discharged at each opening of the dispensing valve is dependent on the length of time said valve is kept open and the head due to the level of liquid in the dispensing valve tank.

2. A machine as set forth in claim 1 and in which said dispensing valve comprises: a cylindrical valve chamber vertically arranged; a bottom wall having a plurality of apertures therethrough; dispensing nozzles depending from the bottom wall of the valve housing and arranged to provide an easy flow of the liquid therethrough; a valve plate fitted upon the upper face of the bottom wall and provided with apertures alignable with the apertures in the bottom wall of the housing by rotation of said valve plate; a vertical shaft effective to oscillate said valve plate about its axis; and operating means extending between the vertical shaft and the mechanism operated by the prime mover effective to oscillate said shaft to open and close said valve.

3. A machine as set forth in claim 1 and in which said dispensing valve comprises; a cylindrical valve chamber vertically arranged; a bottom wall having a plurality of apertures therethrough; dispensing nozzles depending from the bottom wall of the valve housing and arranged to provide an easy flow of the liquid therethrough; a valve plate fitted upon the upper face of the bottom wall and provided with apertures alignable with the apertures in the bottom wall of the housing by rotation of said valve plate; a vertical shaft effective to oscillate said valve plate about its axis; resilient means effective to press the valve plate against the bottom wall of the housing; and operating means extending between the vertical shaft and the mechanism operated by the prime mover effective to oscillate said shaft to open and close said valve.

4. A machine as set forth in claim 1 and in which said dispensing valve comprises: a cylindrical valve chamber vertically arranged; a bottom wall having a plurality of apertures therethrough; dispensing nozzles depending from the bottom wall of the valve housing and arranged to provide an easy flow of the liquid therethrough; a valve plate fitted upon the upper face of the bottom wall and provided with apertures alignable with the apertures in the bottom wall of the housing by rotation of said valve plate; a vertical shaft effective to oscillate said valve plate about its axis; a flexible coupling arranged between said vertical shaft and the valve plate to assure operation of the latter notwithstanding mis-alignment of said shaft and valve plate; and operating means extending between the vertical shaft and the mechanism operated by the prime mover effective to oscillate said shaft to open and close said valve.

5. A machine as set forth in claim 1 and in which said dispensing valve comprises: a cylindrical valve chamber vertically arranged; a bottom wall having a plurality of apertures therethrough; dispensing nozzles depending from the bottom wall of the valve housing and arranged to provide an easy flow of the liquid therethrough; a valve plate fitted upon the upper face of the bottom wall and provided with apertures alignable with the apertures in the bottom wall of the housing by rotation of said valve plate; the apertures in the plate valve and bottom wall of the valve housing being offset slightly relative to one another; a vertical shaft effective to oscillate said valve plate about its axis; and operating means extending between the vertical shaft and the mechanism operated by the prime mover effective to oscillate said shaft to open and close said valve.

6. A machine as set forth in claim 1 and in which the control valve comprises: a valve body providing an inlet chamber on one side and an outlet chamber on the opposite side having a central raised portion of the valve body arranged therein; a front end fluid tight covering extending over said inlet chamber; a back end covering engaging against the periphery of the back of the body and the central raised portion in fluid tight relation thereto; a series of holes extending through said valve body from the front to the back thereof; a shaft rotatably mounted in a bore extending axially through and beyond the valve body and back end covering; a valve plate fitted against the front face of the body in the inlet chamber and secured to said shaft in fluid tight relation to said shaft, said plate having holes alignable with the holes in the valve body or brought out of alignment therewith by rotation of said shaft; and resilient means effective to press the plate against the front face of the valve body.

7. A machine as set forth in claim 6 and in which said resilient means comprise a helical spring mounted on the shaft extending beyond said back end covering and placed under compression between the outer face of said covering and an abutment mounted on said shaft.

8. A packingless fluid control valve comprising: a valve body providing an inlet chamber on one side and an outlet chamber on the opposite side having a central raised portion of the valve body arranged therein; a front end fluid tight covering extending over said inlet chamber; a back end covering engaging against the periphery of the back of the body and the central raised portion in fluid tight relation thereto; a series of holes extending through said valve body from the front to the back thereof; a shaft rotatably mounted in a bore extending axially through and beyond the valve body and back end covering; a valve plate fitted against the front face of the body in the inlet chamber and secured to said shaft in fluid tight relation to said shaft, said plate having holes alignable with the holes in the valve body or brought out of alignment therewith by rotation of said shaft; and resilient means effective to press the plate against the front face of the valve body.

9. In a machine for measuring and dispensing amounts of liquid into a succession of containers, and having means for moving a succession of empty containers to, and removing filled containers from, the machine; a prime mover; a liquid dispensing valve structure; a dispensing valve operating shaft; an operating arm secured to said shaft; a movable member mounted on said arm; cams rotated in opposite directions by said prime mover and effective to engage said movable member to move said arm first in a direction to open said dispensing valve and then in a direction to close said valve after a predetermined interval of time; a source of liquid to be dispensed and conduits leading said liquid to said dispensing valve structure; means for automatically and instantaneously removing said movable member from the path of the cams and closing the dispensing valve in the event of stoppage of the prime mover and also of improper feeding of the containers, and for closing the dispensing valve; and means feeding a succession of containers under said dispensing valve structure to receive liquid therefrom.

10. A machine as set forth in claim 9 and in addition comprising a shaft rotated by said prime mover, a cam fast on said shaft operating to move said arm in a direction to open the dispensing valve; a second shaft and means driven by the prime mover to rotate the second shaft at the same speed as the first shaft; a first cam mounted on said shaft operating to move said arm in a direction to close said dispensing valve;

a second cam on said second shaft having a constant setting with respect to said first cam and effective to operate means holding containers carried by the container feeding means at a filling station for a predetermined period and then releasing the filled container for movement away from the filling station; and means for adjusting the position of the second shaft relative to the driving means therefor to vary the dwell between the operation of the arm to open and to closed position.

11. A machine as set forth in claim 9 and in addition having means for maintaining the containers in filling position, which comprise: a shaft carrying a cam effective to close the dispensing valve and a second cam; carrier members guided for movement toward and away from one another; container stop plates mounted on said carrier members; resilient means urging said carrier members toward one another and the stop plates mounted on the carrier members into position to arrest the containers in the filling station; and means operated by said second cam for momentarily forcing said carrier members apart to withdraw the stop plates from the path of the containers after the flow of liquid from the dispensing valve is stopped and to stop the succeeding empty container at the filling station.

12. A machine as set forth in claim 9 and in which said prime mover is an electric motor and the means effective to hold said movable member in operative position comprise a valve mechanism control solenoid in the circuit of the motor; and resilient means tending to move the movable member out of operative position but overcome by said control solenoid while energised, whereby interruption of the circuit of said electric motor and consequent de-energisation of the control solenoid releases the sliding member to the action of said automatically operating means.

13. A machine as set forth in claim 12 and in addition comprising safety switches located adjacent the means feeding containers to the dispensing valve structure and positioned to be kept open by the passage of containers when properly spaced one closely following the other; a relay operated switch effective when energised to interrupt the circuit of the motor, an electric circuit including said switches and the control solenoid; and resilient means urging said switches toward circuit closing position, the arrangement being such that if the containers arriving at the dispensing valve are improperly positioned the switches are effective to energise the relay operated switch to stop functioning of the machine and de-energisation of the control solenoid until the safety switches are again opened by correct positioning of the containers at the dispensing valve.

14. In a machine for measuring and dispensing amounts of liquid into a succession of containers and having means for moving a succession of empty containers to and removing filled containers from, the machine: a prime mover, a liquid dispensing valve structure; a tank incorporated in said dispensing valve structure; a liquid control valve; conduits leading liquid from a source of supply through said control valve to said dispensing valve tank; means actuated by the level of liquid in said dispensing valve tank to adjust said control valve to maintain a constant predetermined level of liquid in said tank; a dispensing valve operating shaft; an operating arm secured to said shaft; a movable member mounted on said arm; cams rotated in opposite directions by said prime mover and effective to engage said movable member to move said arm first in a direction to open said dispensing valve and then in a direction to close said valve after a predetermined interval of time; means for automatically and instantaneously removing said movable member from the path of the cams and closing the dispensing valve in the event of stoppage of the prime mover and also of improper feeding of the containers, and for closing the dispensing valve; and means feeding a succession of containers under said dispensing valve structure to receive liquid therefrom.

THEODORE RAPP.

REFERENCES CITED

The following references are of record in the file of this patent:

UNITED STATES PATENTS

| Number | Name | Date |
|---|---|---|
| 2,041,358 | Lidberg et al. | May 19, 1936 |
| 2,122,148 | Lawrence | June 28, 1938 |
| 2,411,309 | Whitcomb et al. | Nov. 19, 1946 |